United States Patent
Piccin

(10) Patent No.: US 12,534,029 B2
(45) Date of Patent: Jan. 27, 2026

(54) FABRIC-COVERED VEHICLE INTERIOR PANEL

(71) Applicant: Faurecia Interior Systems, Inc., Auburn Hills, MI (US)

(72) Inventor: Hugo Piccin, Cupertino, CA (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 609 days.

(21) Appl. No.: 17/508,711

(22) Filed: Oct. 22, 2021

(65) Prior Publication Data
US 2023/0126734 A1 Apr. 27, 2023

(51) Int. Cl.
*B60R 13/02* (2006.01)
*B60R 11/02* (2006.01)

(52) U.S. Cl.
CPC ...... *B60R 13/0243* (2013.01); *B60R 11/0217* (2013.01); *B60R 2013/0287* (2013.01)

(58) Field of Classification Search
CPC ...... H04R 1/023; H04R 2499/13; H04R 5/02; H04R 1/30; H04R 1/025; H04R 1/02; B60R 13/0243; B60R 11/0217; B60R 2013/0287; B60R 13/0218; B60R 13/02
USPC ............... 381/86, 340, 360, 361, 365, 423; 296/146.7, 39.1, 1.08, 214
See application file for complete search history.

(56) References Cited

U.S. PATENT DOCUMENTS

| | | | | |
|---|---|---|---|---|
| 3,627,608 A * | 12/1971 | Steiner | ...... | B27D 1/08 264/156 |
| 5,016,936 A * | 5/1991 | Goodrich | ...... | B60R 13/0218 428/95 |
| 5,087,311 A * | 2/1992 | Elliott | ...... | B29C 66/72143 156/212 |
| 5,731,551 A * | 3/1998 | Petrucci | ...... | H04R 1/025 181/150 |
| 10,118,569 B2 * | 11/2018 | Grande Collado | ... | B29C 51/165 |
| 11,511,683 B2 * | 11/2022 | Kumamoto | ...... | B32B 5/026 |
| 2009/0100654 A1 * | 4/2009 | Carps | ...... | F16B 5/07 24/711.4 |
| 2012/0217232 A1 * | 8/2012 | Hermann | ...... | B60H 1/2227 219/202 |
| 2018/0257196 A1 * | 9/2018 | Simpson | ...... | B32B 15/14 |

(Continued)

FOREIGN PATENT DOCUMENTS

| | | | | |
|---|---|---|---|---|
| CN | 108290637 A | * | 7/2018 | ...... B24C 1/04 |
| CN | 110177329 A | | 8/2019 | |
| DE | 202016102228 U1 | * | 5/2017 | ...... B32B 27/12 |

(Continued)

OTHER PUBLICATIONS

CN-108290637-A computer translation (Year: 2018).*
JP-2018144753-A computer translation (Year: 2018).*
Novem (DE 202016102228 U1), machine translation (Year: 2017).*

*Primary Examiner* — Amy R Weisberg
*Assistant Examiner* — Wenwei Zhuo
(74) *Attorney, Agent, or Firm* — Reising Ethington P.C.

(57) ABSTRACT

A vehicle interior panel includes a decorative fabric layer adhered to a concave side of a perforated substrate. Attachment of the fabric layer is via an adhesive layer initially provided in the form of a film. The film is laminated to the fabric layer, which is then adhered to the substrate via the film. Perforations can be formed through the film prior to lamination. The panel is suitable for use over an audio speaker or other device.

14 Claims, 2 Drawing Sheets

(56) References Cited

U.S. PATENT DOCUMENTS

2021/0204045 A1 * 7/2021 Shibakusa .............. H04R 1/023

FOREIGN PATENT DOCUMENTS

| EP | 4090042 A1 | * | 11/2022 | ............ H04R 1/023 |
| FR | 2900881 A1 | * | 11/2007 | ............ B60N 2/448 |
| JP | H6055704 A | | 3/1994 | |
| JP | 2018144753 A | * | 9/2018 | |

* cited by examiner

FABRIC-COVERED VEHICLE INTERIOR PANEL

TECHNICAL FIELD

The present disclosure is related generally to vehicle interior panels and, more particularly, to panels suitable for arrangement over speakers of a vehicle audio system.

BACKGROUND

Vehicle interior designers have long struggled with the integration of audio speakers into the aesthetic look of the interior of the vehicle passenger cabin. Often, audio speakers are mounted to the back side of interior door panels with slots and/or holes formed through the panel at the location of the speaker to permit the sound to come through the speaker. Other times, a speaker grill is mounted over the speaker and protrudes beyond the surface of the surrounding panel. While it is possible to cover flat panels with an acoustically transparent fabric to hide slots or holes in the panel, flat surfaces can be very limiting to vehicle interior designers in terms of style. Convex surfaces can also be covered with fabric to hide an underlying speaker grille but are similarly limiting with regard to aesthetic design.

Chinese patent document CN 110177329 discloses a process for wrapping a cover cloth over a speaker cover with an adhesive tape between the speaker cover and the cover cloth. Like other prior art speaker covers, the cover cloth is wrapped over a convex surface, posing no particular challenges to the skilled artisan.

SUMMARY

In accordance with various embodiments, a vehicle interior panel includes a decorative fabric layer adhered to a concave side of a perforated substrate.

In various embodiments, the fabric layer extends beyond a perimeter of the substrate and is wrapped around an edge of the substrate so that an edge of the fabric layer is located on a side of the substrate opposite the concave side.

In various embodiments, the panel includes an adhesive layer between the fabric layer and the concave side of the substrate.

In various embodiments, the adhesive layer is an adhesive film.

In various embodiments, the entire adhesive layer has a uniform thickness.

In various embodiments, the adhesive layer is unperforated.

In various embodiments, the adhesive layer is perforated.

In various embodiments, perforations of the adhesive layer are sized and shaped the same as perforations of the substrate and are aligned with the perforations of the substrate.

In various embodiments, at least some perforations of the substrate are not aligned with perforations of the adhesive layer.

In various embodiments, the panel includes an audio speaker on a side of the substrate opposite the concave side.

In various embodiments, a method of making the vehicle interior panel includes the step of adhering the decorative fabric layer to the concave side of the perforated substrate. An adhesive film is laminated to the fabric layer before the step of adhering, and the adhesive film faces the concave side of the substrate during the step of adhering.

In various embodiments, a release film is laminated to the fabric layer with the adhesive film between the fabric layer and release film, and the method includes the step of removing the release film before the step of adhering.

In various embodiments, the step of adhering comprises the step of hot pressing the fabric layer to the concave side of the substrate with the adhesive film between the fabric layer and substrate.

In various embodiments, the adhesive film includes laser-cut perforations before the step of adhering.

In various embodiments, the method does not include use of a spray adhesive.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel suitable for use over an audio speaker and a method of making the panel. The following description enables use of a fabric layer over a concave surface and offers new options for vehicle interior aesthetics. While presented here as used over an audio speaker, the panel is also suitable for use over other functional components that emit something other than sound that must pass through the panel to reach the passenger cabin, such as a fragrance dispenser, conditioned air, or ambient lighting.

Figure 1:
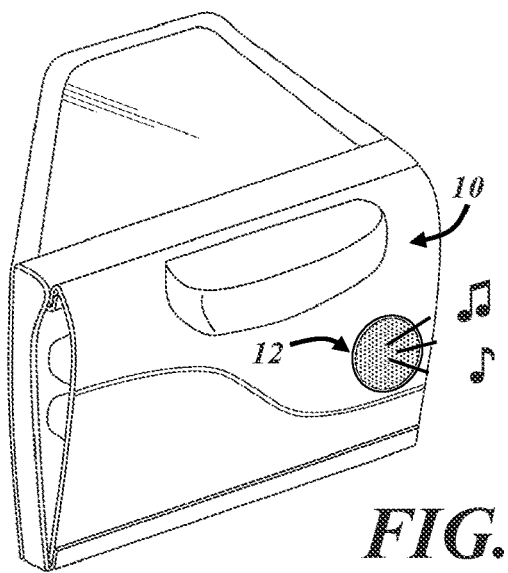
FIG. 1 is a view of a vehicle door equipped with an audio speaker and an illustrative vehicle interior panel.

An illustrative vehicle interior panel 10 is shown in FIG. 1 on the interior side of a vehicle door of the type typically used for ingress and egress to and from a vehicle passenger cabin. The door is equipped with an audio speaker in the space between the interior panel 10 and the exterior door panel. A speaker portion 12 of the panel 10 is aligned over the audio speaker and has perforations to permit sounds produced by the speaker to be audible in the vehicle passenger cabin. In some cases, a fabric layer is disposed over at least the perforated portion of the panel 10 to hide the speaker and/or the perforations and to better integrate the speaker portion 12 of the door panel with the remainder of the door panel and with the remainder of the vehicle interior.

While illustrated in FIG. 1 as an interior door panel 10, the vehicle interior panel described below can be any vehicle interior panel, such as a dash panel, console panel, roof panel, floor panel, or a rear deck panel, to name a few examples. The panel 10 can also be a speaker grille panel that, for example, snaps over the otherwise exposed sound cone of an audio speaker and is carried by the speaker even before it is installed in a vehicle. In some cases, the panel 10 is a subpanel, such as a door panel insert that is snapped into or otherwise attached to an underlying door panel.

Figure 2:
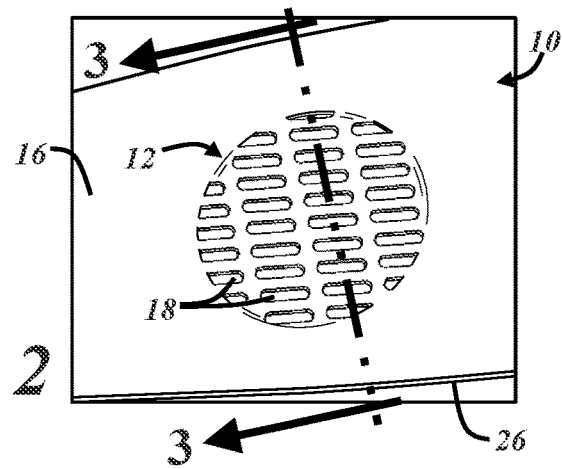
FIG. 2 is a view of a portion of a perforated vehicle interior panel substrate.
Figure 3:
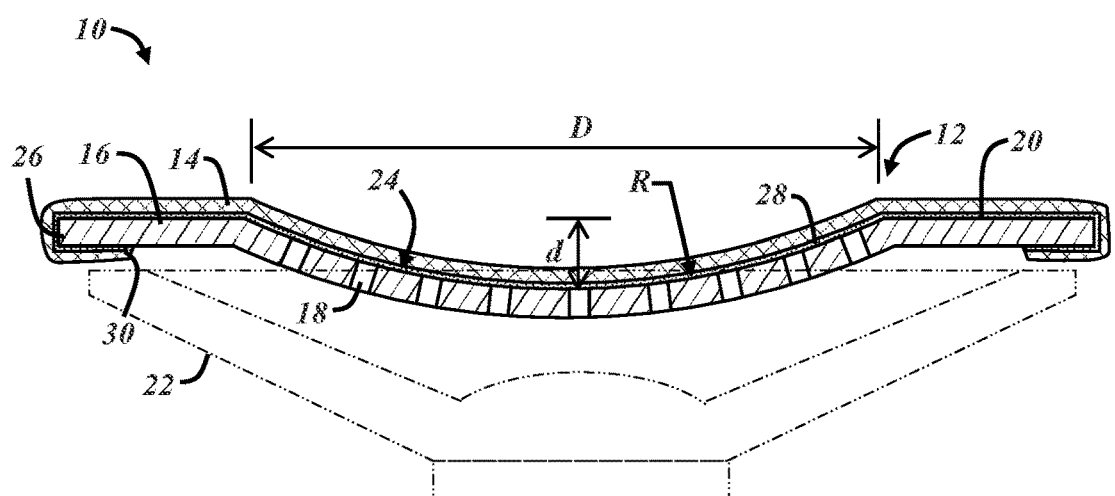
FIG. 3 is a cross-sectional view of a vehicle interior panel formed from the substrate of FIG. 2.

With reference to FIGS. 2 and 3, the panel 10 generally includes a decorative fabric layer 14 adhered to an underlying substrate 16. FIG. 2 illustrates a portion of an illustrative substrate 16 without the fabric layer yet applied. The substrate 16 is plastic (e.g., ABS) or other suitable material and is perforated, having a plurality of perforations 18 formed through the thickness of the material. The substrate 16 may have a thickness between 1.0 mm and 3.0 mm. The illustrated perforations 18 are in a uniform pattern or array in this example and are provided to permit sound pressure waves produced by the underlying speaker to permeate through the substrate with little resistance. The perforations 18 of FIG. 2 are oblong and may range in size from 2.0 mm to 10 mm in width and length. These perforation sizes and shapes are of course non-limiting.

The perforations 18 generally define the location of the speaker portion 12 of the panel 10 and substrate 16. In this example, the perforated speaker portion 12 of the substrate 16 has a circular or round perimeter, with some perforations being smaller than the others where they would otherwise extend beyond the perimeter of the speaker portion. As illustrated in FIG. 3, at least a portion of the speaker portion 12 and of the substrate 16 are concave in shape. In particular, an outer side 20 of the substrate that faces toward the vehicle passenger cabin and away from the audio speaker 22 (shown in phantom view in FIG. 3) is concave or has a concave portion 24. The fabric layer 14 is adhered to the outer side 20 of the perforated substrate 16 at least at the concave portion 24. In this example, the portion of the substrate 16 surrounding the concave portion 24 is flat and extends to opposite edges 26. In other examples, the outer side 20 of the substrate 16 may be convex outside of the concave portion 24.

A concave portion 26 of the substrate can be described as a recess in the outer side 20 of the substrate 16, where the contour of the outer substrate surface dips below or behind the otherwise continuous contour of the surrounding portion of the substrate. That is, the concave portion 24 may represent a discontinuity in an otherwise continuous contour of the outer side 20 of the substrate 16. To be "concave" for purposes of this disclosure, the concavity must at least be visibly perceivable when viewed from 1 meter away by someone with unimpaired vision. In the illustrated example, a radius of curvature (R) of the concave portion 24 is approximately 1.5D, where D is the diameter of the concave portion, and the diameter of the concave portion is approximately 9d, where d is the depth of the concave portion. The radius of curvature (R) may be in a range from 1 to 3 times the diameter (D>R>3D) of the concave portion 24. In various embodiments, the radius of curvature (R) is 500 mm or less. The radius of curvature (R) may be 25 mm or greater. It is also noted that the concave portion does not necessarily have a single radius of curvature. In various embodiments, the diameter (D) of the concave portion 24 is in a range from 50 mm to 300 mm.

The decorative fabric layer 14 is a knitted or woven fabric designed to be essentially acoustically transparent (e.g., greater than 80% acoustically transparent in the frequency range of human hearing). Polyester or other suitable fibers can be used to make the fabric layer 14. Acoustic transparency requires a relatively large openness ratio, which is the percentage of open area (i.e., the space between adjacent threads) in any unit area of the fabric. The openness ratio may for example be 30% or greater or 50% or greater.

The particular geometry and end-use application of the panel 10 pose several challenges related to attachment of the fabric layer 14 to the substrate 16. As an initial matter, the concave portion 24 of the substrate precludes a stretch-wrap sort of attachment like that typically used when upholstering an object with fabric. More specifically, simply wrapping the outer side 20 of the substrate with the fabric layer 14 would result in a flat fabric layer that completely hides the concave portion 24.

To address this problem, the fabric layer 14 is adhered to the substrate 16 by an interposed adhesive layer 28. The adhesive layer 28 is a relatively thin layer ranging in thickness from 10 μm to 150 μm. Suitable adhesives include certain polyurethanes or urethane copolymers, such as polyurethane/copolyamide. However, use of an adhesive material only addresses part of the problem. In particular, spray-on adhesives are favored in vehicle applications in which a fabric layer must be attached to an underlying substrate, but the geometry of the substrate 16 and the openness ratio of the fabric in this case pose application specific problems with spray-on adhesives.

For example, the concave portion 24 of the substrate behaves like a dish when an aerosol material is sprayed toward the concavity. The propellant fluid carrying the adhesive material encounters the dished surface and is in large part redirected toward the spraying apparatus. The adhesive material follows the fluid in which it is carried along the turbulent eddies generated in the concave portion 24 during spraying. The result is a large part of the adhesive intended for deposition on the substrate never reaching its destination. This is the case even with high-velocity low-pressure (HVLP) spray guns. Even when some adhesive material is deposited on the concave portion 24, the film thickness is very non-uniform, with the substrate surface outside the concave portion being coated in a thick layer of adhesive to achieve only a very thin layer in the concave portion.

One potential solution to this problem is to spray the non-decorative side of the fabric layer 14 with the adhesive, which can be done in-the-flat without the dish-effect of the concave portion 24 of the substrate 16. But this generates yet other problems, which include clogging of the inter-fiber openings in the fabric and an undesirable hardening of the fabric. For instance, in order to make a suitable adhesive sprayable, it may necessary to excessively thin that adhesive with additional solvent. The resulting low viscosity spray-adhesive mixture is then suitable to spray, but the thinned adhesive mixture may also be readily absorbed into the threads of the fabric and between the threads of the fabric and toward the decorative side of the fabric by surface tension effect before the solvent evaporates to allow the adhesive to cure. The result is a loss of acoustic transparency of the fabric layer 14 and hardening of the threads of the fabric, which have been infused by the thinned adhesive mixture, leaving cured adhesive infused in the fabric after the solvent evaporates.

In the example of FIG. 3, the adhesive layer 28 is provided in the form of a solid film, or a semi-cured adhesive film that cures in-place once the fabric layer 14 is attached to the substrate. The result is an adhesive layer 28 with a uniform thickness that neither clogs nor undesirably hardens the overlying fabric layer 14. In the illustrated embodiment, the adhesive layer 28 extends over the entire outer side 20 of the substrate. The fabric layer 14 extends over the entire concave portion 24 of the substrate 16 and wraps around the edges 26 of the substrate so that edges 30 of the fabric layer 14 are along the opposite side of the substrate. In this example, the adhesive layer 28 and the fabric layer 14 are pre-laminated, so the adhesive layer also wraps around the edges 26 of the substrate.

The adhesive film may be provided as a reactive adhesive film that crosslinks when heat-activated—i.e., to form a thermoset adhesive layer 28. Crosslinking can be initiated at a temperature at or above 75° C. in some cases. The cured film may have an elongation at break of greater than 200% and as high as 800% or higher, as well as a tensile strength in a range from 10 MPa to 50 MPa, or nominally about 30 MPa. Some suitable adhesive films are commercially available under the Flexel™ tradename, such as Flexel RFA1005, FN2100, FN1000, or EM9002 (H.B. Fuller, St. Paul, MN, USA), Other brands, material types, and formulations are possible.

Figure 4:
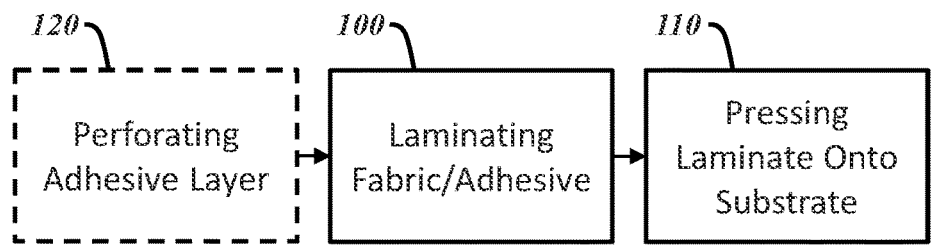
FIG. 4 depicts an exemplary method of making the panel of FIG. 3.

With reference to FIG. 4, an exemplary method of making the panel 10 includes the step 100 of laminating an adhesive film together with the fabric layer 14, via calendaring for example, followed by the step 110 of pressing the laminate onto the substrate 16. The step of laminating may include first providing the adhesive film on a carrier or release film and then pressing the adhesive film onto the non-decorative side (i.e., the side intended to face away from the vehicle passenger cabin) of the fabric layer 14, with the adhesive film between the fabric layer 14 and the release film. The step of pressing may include removing the release film from the laminate, disposing the laminate over the substrate 16 with the exposed adhesive film facing the substrate, and then pressing the layered structure together to adhere the fabric layer 14 to the substrate 16.

The step of pressing may include hot pressing, which can soften the adhesive film to help the film take the shape of the concave portion of the substrate, and/or cure the adhesive film into the final adhesive layer 28. The step of pressing can be performed with a pressing tool having a first portion with a cavity in the shape of the convex side of the substrate 16 and a second portion with a core in the shape of the concave side of the substrate. The substrate and fabric/adhesive laminate are placed between the tool portions, which are then brought together to press the laminate together with the substrate 16 to adhere the fabric layer 14 to the substrate and form the panel 10.

In one embodiment, the step 110 of pressing includes hot pressing at a temperature between 120° C. and 150° C., or about 130° C. In another embodiment, the step 110 of pressing includes hot pressing at a temperature between 75° C. and 110° C. The hot pressing may have a duration in a range from 30 seconds to 90 seconds, or about 60 seconds. In one particular embodiment, the hot-pressing temperature is between 145° C. and 155° C. for a duration between 25 and 30 seconds. The applied pressure during pressing may be in a range from 100-250 kPa (15-35 psi or 1-2.5 bar). In another embodiment, the step 100 of laminating includes passing the adhesive film and release layer together with the separately provided fabric layer between rollers at a temperature between 120° C. and 150° C., or about 130° C. at a pressure between 6-10 bar, or about 8 bar. In another example, the adhesive film can be pre-tacked to the fabric layer at a lower temperature and pressure, such as a temperature between 45-50° C. and a pressure between 50-200 kPa. These temperatures and pressures may vary, depending at least on the composition of the adhesive material.

As noted above, the thickness of the adhesive layer 28 may be in a range from 10 µm to 150 µm and may preferably be in a range from 40 µm to 60 µm, or about 50 µm. In other cases, it may be preferable that the adhesive layer has a thickness in a range from 10 µm to 20 µm, or about 15 µm. The different thickness ranges depend at least in part on whether or not the optional step 120 of perforating the adhesive film (FIG. 4) is performed. In the example of FIG. 3, the adhesive layer 28 is not perforated, such that the adhesive layer covers the perforations 18 in the substrate. It has been surprisingly found that, if the adhesive layer 28 is kept sufficiently thin, such as less than 50 µm, or between 10 µm and 20 µm, acoustic transparency is largely maintained in the frequency range of human hearing. This is due at least in part to the adhesive layer 28 being formed from a uniform film rather than a spray.

Figure 5:
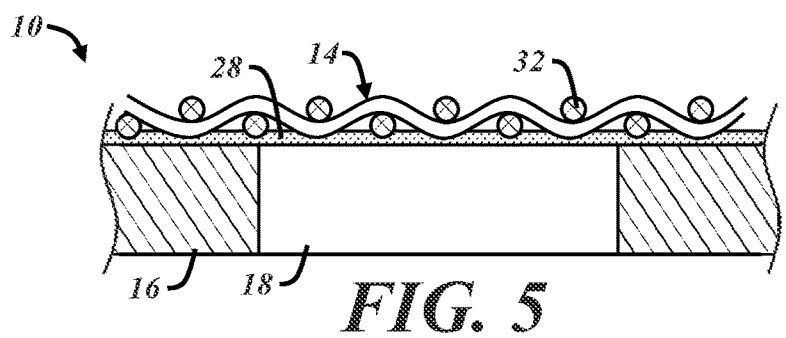
FIG. 5 is an enlarged view of a portion of the panel of FIG. 3 at a perforation in the substrate.
Figure 6:
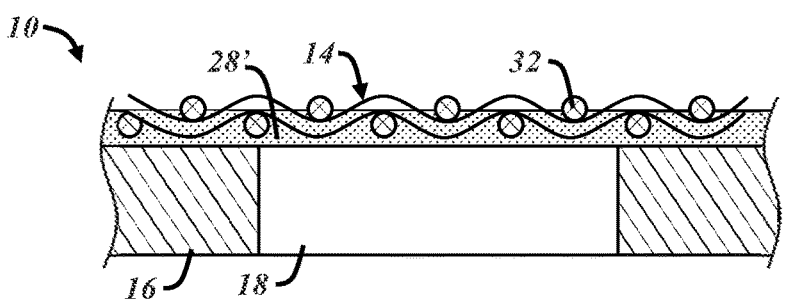
FIG. 6 is the same view as FIG. 5 demonstrating a spray adhesive.

FIGS. 5 and 6 schematically illustrate a difference between the adhesive layer 28 when applied as in the method of FIG. 4 and as a spray adhesive. FIG. 5 is an enlarged cross-sectional view of the panel of FIG. 3 at a perforation 18 of the substrate 16. The adhesive layer 28 is relatively thin and generally adheres the bottom side of the threads 32 of the fabric to the substrate. FIG. 6 is the same view with spray adhesive 28' applied to the fabric layer 14. While the figures may not be to scale, the spray adhesive permeates through a much greater portion of the thickness of the fabric layer 14—possibly up to about 1 mm or the entire thickness of the fabric layer. The spray adhesive 28' may effectively clog the fabric layer, while the adhesive layer 28 in film form does not clog the fabric layer and instead provides the adhesive layer in a uniform thickness everywhere it is applied.

Figure 7:
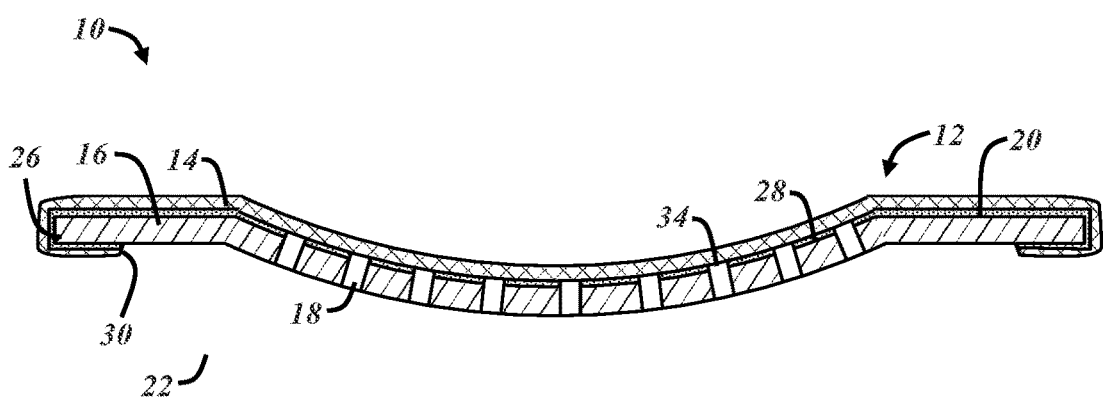
FIG. 7 is a cross-sectional view of the vehicle interior panel of FIG. 3 with a perforated adhesive layer.

In the embodiment of FIG. 7, the adhesive layer 28 is perforated, having perforations 34 formed through its thickness. With reference to FIG. 4, the method may therefore additionally include perforating the adhesive layer. In the example of FIG. 4, the adhesive layer is perforated before it is laminated with the fabric layer 14. Perforation of the adhesive layer can be performed while the adhesive film is still on the release film. In one embodiment, a laser (e.g., a UV or YAG laser) is used to form the perforations. It is also possible to die cut the perforations with the adhesive film between two layers of release film.

In some embodiments, such as that of FIG. 7, the perforations 34 of the adhesive layer are formed in the same pattern as the perforations 18 are formed in the substrate so that, when pressed together, the two sets of perforations 18, 34 are in registration with each other or at least partially overlap with each other. The perforations 34 of the adhesive layer can be the same size and shape as the perforations in the substrate such that at least some of the perforations of the substrate are entirely uncovered by the adhesive layer. To achieve registration of the two sets of perforations 18, 34, a position system may be used to properly align the prelaminated fabric and adhesive layers with the substrate. The positioning system may for example include alignment pins that at least partly define an origin or datum of the adhesive layer, the fabric layer, and/or both layers laminated together. For instance, alignment pins may be used during formation of the perforations 34 of the adhesive layer so that their position is known with respect to the alignment pins. Later, while adhering the fabric layer to the substrate, both the substrate and prelaminated fabric layer can be arranged with respective datums arranged so that the two sets of perforations are aligned during the step of adhering. Other positioning systems may use a vision system or light and suitable sensors to align the sets of perforations before and during the step of adhering.

In other embodiments, at least some of the perforations 34 of the adhesive layer 28 are not aligned with perforations 18 of the substrate 16. In one example the perforations 34 are formed through the adhesive layer in a uniform pattern that is different from the uniform pattern of perforations 18 in the substrate 16. In this manner, portions of some adhesive layer perforations 34 will be aligned with portions of some substrate perforations 18, and acoustic transparency can be largely maintained without the need to fully align the perforations 18, 34 with each other. In this case, the adhesive layer 28 preferably has a thickness in a range from 40 µm to 60 µm, or about 50 µm.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel comprising a decorative fabric layer adhered to a concave portion of an outer side of a perforated substrate by an adhesive layer between the fabric layer and the concave portion of the substrate, the outer side facing toward a passenger cabin of a vehicle when the panel is installed in the vehicle, wherein the adhesive layer is an adhesive film having the shape of the concave portion of the substrate, and wherein the adhesive layer is perforated.

2. The vehicle interior panel of claim 1, wherein the fabric layer extends beyond a perimeter of the substrate and is wrapped around an edge of the substrate so that an edge of the fabric layer is located on a side of the substrate opposite the outer side.

3. The vehicle interior panel of claim 1, wherein the entire adhesive layer has a uniform thickness.

4. The vehicle interior panel of claim 1, wherein perforations of the adhesive layer are sized and shaped the same as perforations of the substrate and are aligned with perforations of the substrate.

5. The vehicle interior panel of claim 1, wherein at least some perforations of the substrate are not aligned with perforations of the adhesive layer.

6. The vehicle interior panel of claim 1, further comprising an audio speaker on a side of the substrate opposite the outer side.

7. A method of making the vehicle interior panel of claim 1, comprising the step of adhering the decorative fabric layer to the concave portion of the perforated substrate, wherein the adhesive film is laminated to the fabric layer before the step of adhering, and the adhesive film faces the outer side of the substrate during the step of adhering.

8. The method of claim 7, wherein a release film is laminated to the fabric layer with the adhesive film between the fabric layer and release film, the method further comprising the step of removing the release film before the step of adhering.

9. The method of claim 7, wherein the step of adhering comprises the step of hot pressing the fabric layer to the concave portion of the substrate with the adhesive film between the fabric layer and substrate.

10. The method of claim 7, wherein the adhesive film is perforated using a laser before the step of adhering.

11. The method of claim 7, further comprising a step of perforating the adhesive layer prior to laminating the adhesive layer with the fabric layer.

12. The vehicle interior panel of claim 1, wherein the fabric layer hides perforations of the perforated substrate.

13. The vehicle interior panel of claim 1, wherein the fabric layer is a knitted or woven fabric.

14. The vehicle interior panel of claim 1, wherein the adhesive film is laminated to the fabric layer.

* * * * *